Figure 1:
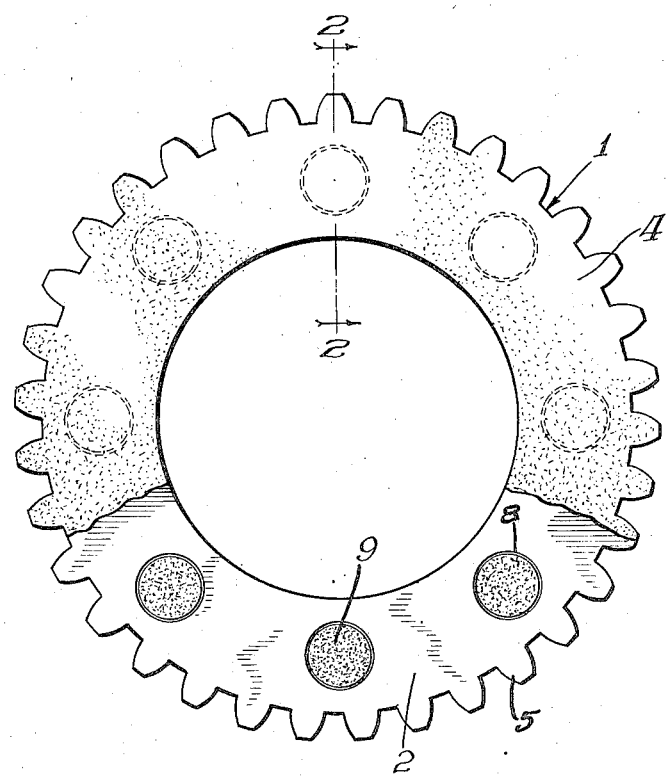

Nov. 3, 1936.    J. A. GLICK    2,059,576
REENFORCED CLUTCH RING
Filed Feb. 27, 1935

Inventor:
John A. Glick
By Lee J. Gary
Attorney

Patented Nov. 3, 1936

2,059,576

UNITED STATES PATENT OFFICE 2,059,576

REENFORCED CLUTCH RING

John A. Glick, Milford, Conn., assignor to Raybestos-Manhattan, Inc., Bridgeport, Conn., a corporation of New Jersey Application February 27, 1935, Serial No. 8,500

10 Claims. (Cl. 192—107)

This invention relates to improvements in reenforced friction rings or clutch plates and refers specifically to a structure of this type characterized by the manner of securing the friction facings and reinforcing member together as an assembled whole.

It has heretofore been proposed to reenforce friction rings and plates, particularly for clutches, by riveting friction facings upon a metal supporting base. Many disadvantages are inherent in this type of reenforced clutch ring or plate and in the process of making such a plate, among which may be mentioned; the presence of the metal rivets increases the spinning weight of the clutch; a riveted facing will bear upon the rivets when the facing is partially worn through; and the process of riveting is slow and costly.

Another construction which has heretofore been proposed comprises adhesively uniting friction discs or rings directly upon the faces of a reenforcing support. This construction is characterized by the defect that the friction facings used and the metal support have different coefficients of expansion and, consequently, when the clutch becomes heated the adhesive bond breaks rendering the clutch plate or ring substantially useless.

In my invention a friction plate or ring is provided which comprises essentially a metal reenforcing member and a friction facing mounted upon each side of said member. The reenforcing member may be provided with a plurality of apertures adapted to receive a plurality of tabs or plugs constructed of a material similar to that of the friction facings, said facings being mounted upon said reenforcing members and secured together by means of adhesive contact between said facing and said tabs or plugs.

A clutch plate or ring constructed in accordance with the concept of my invention provides maximum life to the clutch facing since no foreign material such as metal rivets extend into the thickness of the facing. The spinning weight of the clutch is not increased by the presence of metal rivets and in fact is decreased due to the provision of the apertures in the metal reenforcing member. In addition, since the tabs or plugs are constructed of materials having substantially the same properties in regard to expansion and contraction, the bond between the facings and the tabs will not be injuriously affected by changes in temperature and, consequently, the facings will be securely maintained upon the reenforcing support. Further, the process of manufacture is exceedingly simple and economical.

Other objects and advantages of my invention will be apparent from the accompanying drawing and following detailed description.

In the drawing, Fig. 1 is a face view, parts being broken away, showing a clutch ring constructed in accordance with my invention.

Figure 2:
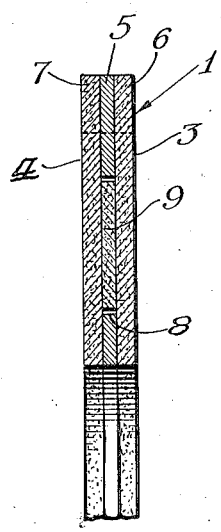

Fig. 2 is a sectional view taken on line 2—2 of Fig. 1.

Referring in detail to the drawing, 1 indicates a reenforced clutch ring made in accordance with the concept of my invention. The ring 1 comprises a metal reenforcing or base member 2 and friction facings 3 and 4 secured, in a manner to be hereinafter more fully described, to each face of the member 2.

The member 2 may be constructed of steel, copper, brass or any other suitable metal and may, if desired, be provided with peripheral splines 5 in which case the facings 3 and 4 will also be provided with splines 6 and 7 respectively. However, it is to be understood that my invention may be utilized in conjunction with the conventional annular clutch ring and its efficacy is not dependent upon the provision of peripheral splines.

The primary feature of my invention resides in the manner of securing the friction facings 3 and 4 to the base member 2 and comprises the provision of a plurality of circumferentially spaced apertures 8 in the base member 2 in which plugs 9 may be disposed, said plugs serving as a connecting medium for the facings 3 and 4.

The facings 3 and 4 may be constructed of asbestos or other fibrous material impregnated with a friction producing saturant and preferably previously cured. Plugs 9 may be constructed of a similar material. Plugs 9 may be of substantially the same thickness as the base member 2 and may fit more or less snugly within apertures 8, which latter may be of substantially any shape and size in keeping with dimensions of the member 2. That is, the number and size of the apertures 8 must not be such as to materially weaken the member 2.

To assemble the ring 1, an adhesive material such as a phenolic resin cement may be applied to one face of one of the facings 3 or 4. Said facing may then be applied to the member 2, the faces of which have been previously roughened and dipped in the cement. Inserts 9 may be positioned in apertures 8 and one face of the opposite facing coated with cement and applied to the opposite roughened face of the member 2. The assembly may then be cured under heat and pressure. Inasmuch as the bond between the inserts 8 and the facings 3 and 4 is much more firm and reliable than the bond between the facings and the base member 2, the inserts form keys of strong adhesion so that the two facings grip the metal even when the cement in contact with the metal has lost its adhesion.

Phenolic resin cement is mentioned above, but any other type of cement which will harden under heat and pressure may be used. In addition, as above mentioned, the shape, area and number of apertures 8 is not to be limited to the specific embodiment shown. However, it is important that the plugs or inserts 9 have substantially the same thickness as the member 2 and that they fit the apertures in the base member as snugly as rapid assembly will permit.

I claim as my invention:

1. A friction ring comprising a reenforcing plate provided with a plurality of apertures, plugs insertable in said apertures, and imperforated friction facings positioned upon opposite faces of said plate and adhesively united to said plugs.

2. A friction ring comprising a reenforcing plate provided with a plurality of apertures, plugs insertable in said apertures, and imperforated friction facings positioned upon opposite faces of said plate and adhesively united to said plugs, said plugs being constructed of a material similar to that comprising said friction facings.

3. A friction ring comprising a reenforcing plate provided with a plurality of apertures, plugs insertable in said apertures, and imperforated friction facings positioned upon opposite faces of said plate and adhesively united to said plugs, said plugs being constructed of a material similar to that comprising said friction facings, and being substantially equal in thickness to the thickness of said plate.

4. A friction ring comprising a reenforcing metal plate provided with a plurality of apertures, plugs insertable in said apertures, and cured and imperforated friction facings positioned upon opposite faces of said plate and adhesively united to said plugs.

5. A friction ring comprising a reenforcing metal plate provided with a plurality of circumferentially spaced apertures, plugs insertable in said apertures, and cured and imperforated friction facings positioned upon opposite faces of said plate and adhesively united to said plugs.

6. A friction ring comprising a reenforcing metal plate provided with a plurality of apertures, plugs insertable in said apertures, and cured and imperforated friction facings positioned upon opposite faces of said plate and adhesively united to said plugs, said plugs being constructed of a material similar to that comprising said friction facings.

7. A friction element comprising a reenforcing plate provided with a plurality of apertures, rigid plugs insertable in said apertures and rigid imperforated friction facings superimposed upon opposite faces of said plate and the inner surfaces of said facings being adhesively secured to the adjacent ends of said plugs.

8. A friction element comprising a reenforcing plate provided with a plurality of apertures, rigid plugs insertable in said apertures and terminating substantially flush with the faces of said plate, and rigid imperforated friction facings superimposed upon opposite faces of said plate and the inner surfaces of said facings being adhesively secured to the adjacent ends of said plugs.

9. A friction element comprising a reenforcing plate provided with a plurality of apertures, rigid plugs insertable in said apertures and terminating substantially flush with the faces of said plate, and rigid imperforated friction facings superimposed upon opposite faces of said plate and the inner surfaces of said facings being adhesively secured to the adjacent ends of said plugs, said plugs and friction facings being pre-formed of fibrous material.

10. A friction element comprising a pair of axially spaced apart, pre-formed imperforated annular friction facings of fibrous material, a plurality of pre-formed rigid plugs of fibrous material interposed between said facings and having the ends adhesively secured to the inner faces thereof, and reenforcing means for said element secured between said friction facings.

JOHN A. GLICK.